United States Patent
Sasaki

[11] Patent Number: 5,081,811
[45] Date of Patent: Jan. 21, 1992

[54] SELF-LOCKING NUT MECHANISM

[75] Inventor: Kensuke Sasaki, Fukuoka, Japan

[73] Assignee: Housei Ttekou Co., Ltd., Fukuoka, Japan

[21] Appl. No.: 662,080

[22] Filed: Feb. 28, 1991

[30] Foreign Application Priority Data

Sep. 7, 1989 [JP] Japan .................. 1-105921

[51] Int. Cl.$^5$ .................................... E05C 5/04
[52] U.S. Cl. .......................... 52/227; 52/233; 52/713; 411/433
[58] Field of Search ............ 411/265, 266, 267, 433; 52/233, 713

[56] References Cited

U.S. PATENT DOCUMENTS

| 2,367,480 | 1/1945 | Beswick | 411/433 |
| 4,823,528 | 4/1989 | Faw | 52/233 |
| 4,974,888 | 12/1990 | Childers | 411/433 |

FOREIGN PATENT DOCUMENTS

| 2615891 | 10/1977 | Fed. Rep. of Germany | 52/233 |
| 0558302 | 12/1943 | United Kingdom | 411/433 |

Primary Examiner—Richard E. Chilcot, Jr.
Assistant Examiner—Wynn Wood
Attorney, Agent, or Firm—Jordan and Hamburg

[57] ABSTRACT

A self-locking nut mechanism is operable to be mounted on a bolt element to secure structural members together and includes a nut body having a cylindrical portion and a flange portion. A through hole in the nut body has a first hole portion with one diameter and a second hole portion with another larger diameter, the nut body having a transition section between the first and second hole portions with such transition section having a first tapered part. A split nut is disposed in the second hole portion, the split nut being split into at least two split-nut sections. The split nut has a longitudinal end having a second tapered part. A spring in the nut body biases the split-nut toward the first tapered part such that the first and second tapered parts are biasingly engaged. The bolt element has external fastenings, and the split-nut has internal fastenings. The bolt element is axially insertable into the split nut such that the external fastenings engage the internal fastenings to temporarily separate the split-nut section against the bias of the spring as the first tapered part engages the second tapered part, the bolt elements being precluded from being withdrawn axially from the split nut by the mating of the external and internal fastenings.

12 Claims, 4 Drawing Sheets

SELF-LOCKING NUT MECHANISM

BACKGROUND OF THE INVENTION

The present invention relates to the fastening of wood logs used, for example, in building log houses and, more particularly, relates to a nut that automatically prevents loosening of log walls caused by contraction or warping of the wood logs.

In prior log house buildings made of wood log assemblies, a wall system is constructed by placing the wood logs one over the other and fastening them together with through bolts and nuts. However, in environments of seasonal change and great differences in humidity, the respective wood logs or squared logs become loose from their fastenings because of contraction and fail to retain airtightness because of distortion and warping, thereby requiring regular maintenance.

SUMMARY OF THE INVENTION

An object of the invention is to provide a self-locking nut mechanism which retains its fastened state by automatically countering contraction of the wood, thereby overcoming the disadvantages described above.

The self-locking nut mechanism of the present invention includes a self-locking nut with a mechanism having a nut body with a cylinder that is open from top to bottom and an integral crown with plural fastening holes through its periphery. A through bolt insertion hole passes through the center of the upper end of the cylinder. The nut body has a taper that increases in size diametrically downward from the lower end of the peripheral edge of the through bolt insertion hole. A through bolt fastener has at least two parts and a taper formed at the periphery of its upper end that presses against the nut body taper and has in its inner wall fastening means or projections that mutually match engageable fastening means or through bolt mooring projections to provide a state where the taper of the through bolt fastener is in pressure contact with the nut body taper by means of pressure from a spring element that is enclosed inside the nut body.

DESCRIPTION OF THE PREFERRED EMBODIMENTS

The mechanism and operational state of one embodiment of the present invention will be explained with reference to the drawings.

Figure 1:
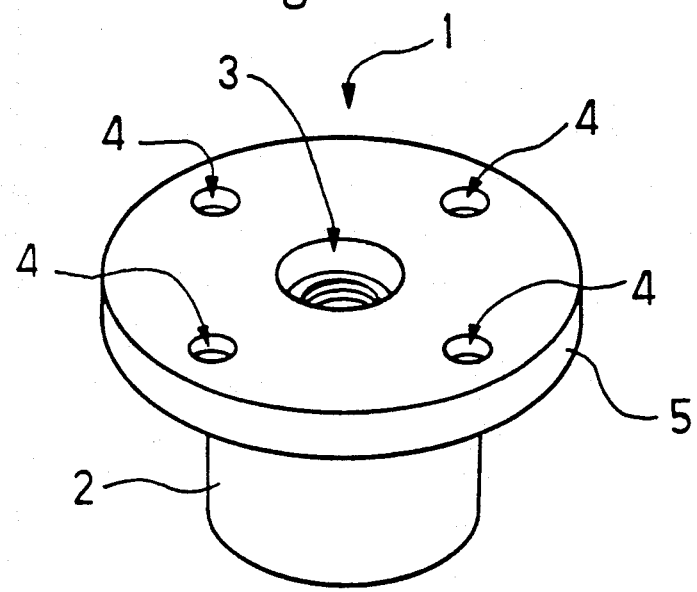
FIG. 1 is a perspective view of a self-locking nut mechanism according to one embodiment of the present invention.

FIG. 1 shows nut body 1 having a disc-shaped crown or flange portion 5 formed integrally on the upper end of a cylinder portion 2 with a bolt insertion hole 3 through its center and plural fastening holes 4 through the crown portion 5.

Figure 2:
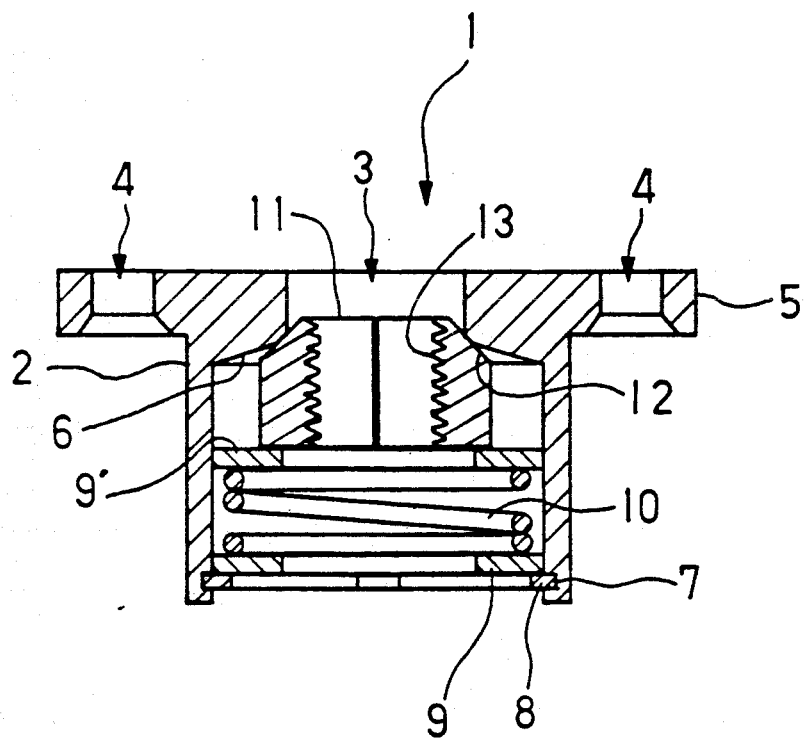
FIG. 2 is a sectional view of FIG. 1.

FIG. 2 is a sectional diagram showing the internal mechanism in which the upper inner end of the cylinder portion 2 has a conical and tapered section 6 formed so that its diameter increases in the direction downwardly from the lower end of the peripheral edge of the through bolt insertion hole 3. A groove 7 is provided along the lower inner periphery of the cylinder portion 2, and a metal washer mooring ring element 8 is inset inside the groove 7. A metal washer 9 is placed on metal washer mooring ring element 8, a spring element 10 is placed on the metal washer 9, and another metal washer 9' is placed on the upper end of the spring element 10 in a manner such that a through bolt can be freely inserted, as will be described.

A split nut or through bolt fastener 11 is placed over the metal washer 9'. The through bolt fastener 11 has a taper 12 formed on the outer periphery of one end thereof, and this taper 12 contacts the expanding diameter taper 6. The fastener 11 has fastening means or mooring projections 13 projecting radially inwardly of its inner wall. The mooring projections 13 may comprise a thread or tapered projections.

Figure 3:
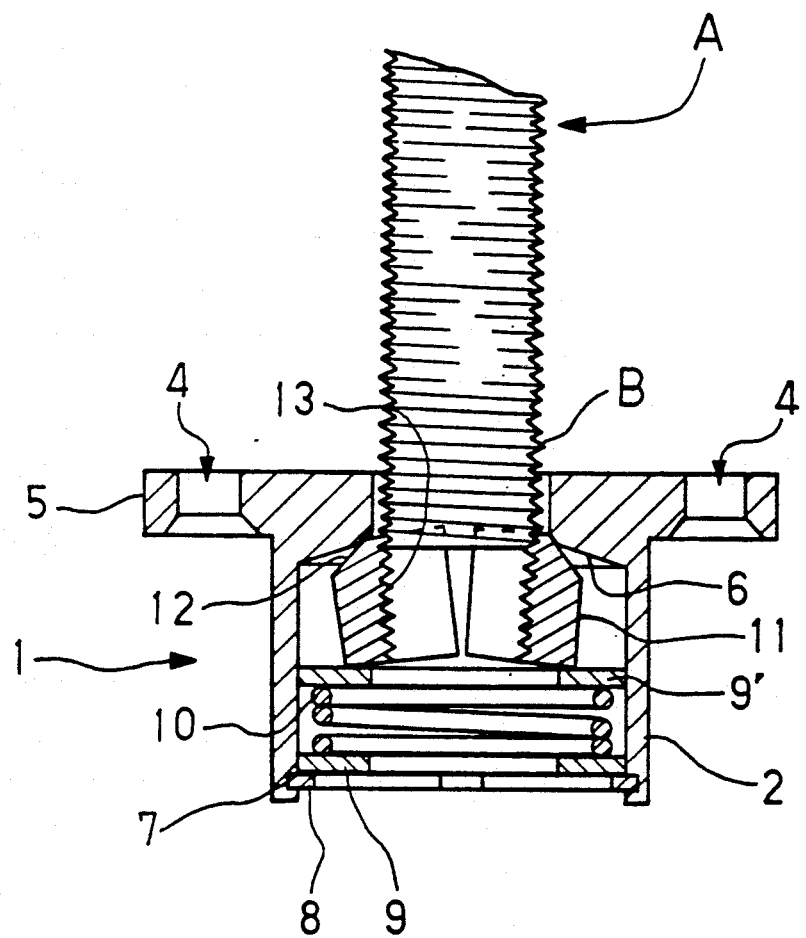
FIG. 3 is a sectional view similar to FIG. 1 showing an inserted through bolt.

FIG. 3 shows the self-locking nut mechanism in which a through bolt A is inserted in the through bolt fastener 11 of nut body 1. Tapered section 6 and tapered portion 12 are pressed together by the force of the spring 10 and therefore the through bolt fastener 11 biasingly maintains a state where its inner diameter is constricted. However, when screw portion B of through bolt A is inserted inside bolt insertion hole 3, portion B presses and expands bolt fastener 11 counter to the bias of the spring 10, and subsequently the through bolt mooring projections 13 and screw B mutually engage and maintain a moored state.

Figure 4:
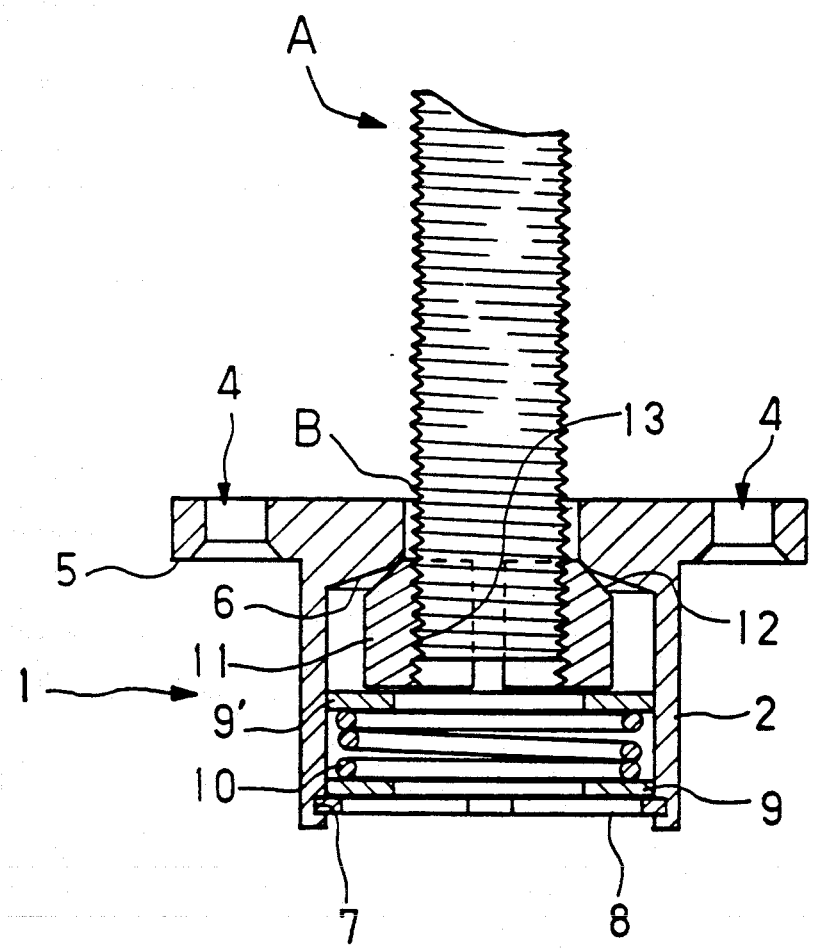
FIG. 4 is a view similar to FIG. 1 showing an operational state of fastening where the through bolt extends inside the self-locking nut because of wood contraction.

FIG. 4 shows an operable state where bolt A has descended because of the contraction of the wood where, because of the load on through bolt A from the contraction of the wood, the through bolt fastener 11 is expanded in diameter by being pressed out by portion B of the through bolt A while overcoming the force of the spring 10 so that screw portion B descends until moored by engagement with through bolt mooring projections 13. In response to the load on the upper part of through bolt A coming from the warping and distortion of the wood and the counter force of spring 10 and the pressure contact between taper 12 of through bolt fastener 11 and taper 6, the inner diameter of through bolt fastener 11 contracts so that the mooring between portion B of through bolt A and through bolt mooring projections 13 is made strong and firm.

Assembly of the self-locking nut of the present invention is effected by inserting through bolt fastener 11 from the bottom of cylinder portion 2, then inserting washer 9', and after inserting the spring 10, pressing in the spring 10 with metal washer 9 counter to the force of spring 10, and then enclosing it together with metal washer 9 by means of metal washer mooring ring element 8.

Figure 5:
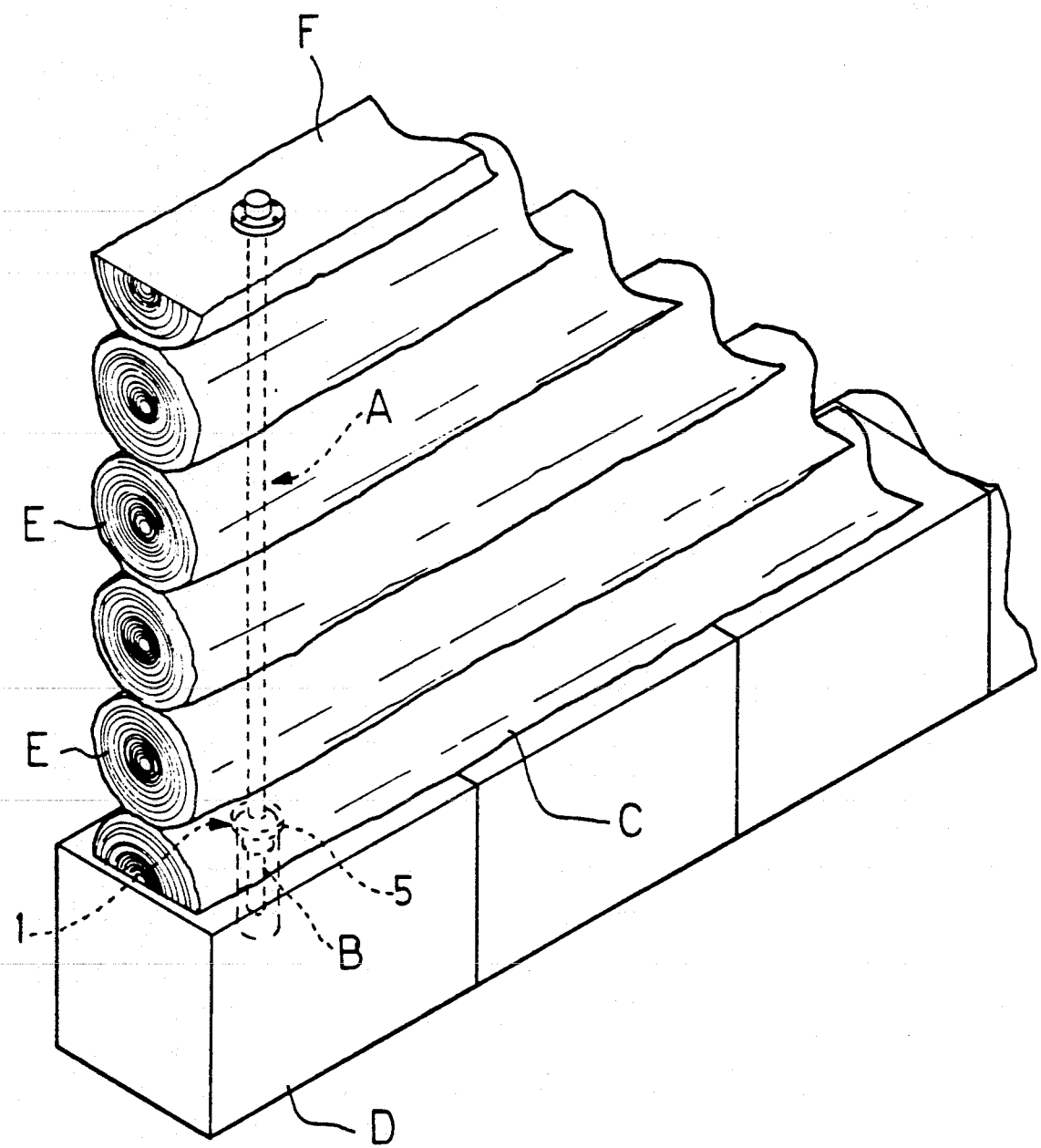
FIG. 5 is a perspective view showing use of the self-locking nut mechanism of the present invention.

FIG. 5 shows an example of the use of the self-locking nut of the present invention and shows a wall system of a log house building. Nut body 1 is fastened to the bottom of base wood member C using nails or screws in fastening holes 4 of crown 5. The self-locking nut mechanism is inserted into a hole opened in base block D. Wood logs E are piled one over the other on base wood member C. The upper end of bolt A is fastened to the upper end surface of the top half-log F through which bolt A is inserted, and the lower end with screw portion B is inserted into through bolt insertion hole 3 of the nut body 1. Consequently, each of the plurality of wood logs E on the base wood C is fastened firmly by the through bolt A and nut body 1. When several wood logs E are contracted by environmental changes, the through bolt A descends together with the wood logs E according to the contracted length. However, the fastened state is maintained without occurrence of spacing between the logs, and the fastened state is maintained without rising of the through bolt A.

The self-locking nut of the present invention operates as a lock during the swelling that occurs after contractions in wall systems built with through bolts in log house buildings. It promotes close adherence of log to log by the tension from contraction and warping, and it maintains airtightness in a manner that was not heretofore possible. At the same time, it decreases disarray in the logs and improves their stability by increasing their close adhesion and makes possible a log house which does not require maintenance.

When the wood logs contract and the bolt A descends, as previously described, the bolt A is forced to move axially (without rotating) into the through bolt fastener 11 such that the fastening means 13 engage the fastening means on bolt portion B and cause the split parts of the through bolt fastener 13 to separate or move outwardly radially due to the interaction of such fastening means and the interaction of the engaging tapers 6 and 12 and the spring 10. Subsequently, when the bolt A is no longer being forced to move axially into the through bolt fastener 11, the split parts of the through bolt fastener 11 come together again to retain the through bolt A as the fastener means 13 engage the fastening means on the portion B of bolt A. Thus the bolt A can be forced axially into the through bolt fastener 11 (without being rotated) but is precluded from being withdrawn from the through bolt fastener (without being rotated).

The fastening means 13 on the through bolt fastener 11 and the fastening means on the portion B of bolt A may be helical threads. Alternatively, such fastening means may consist of a plurality of projections having inclined surfaces (when viewed in cross section) disposed helically or circularly or in spaced helical or circular array. A flange or bolt head part may be secured to the upper end of bolt A and this flange part may be secured to the upper log F by fastening means passing through openings in the flange part as shown in the upper portion of FIG. 5.

What I claim is:

1. A self-locking nut mechanism operable to be mounted on a bolt element to secure structural members together comprising a nut body having a cylindrical portion and a flange portion, means on said flange portion for fastening said nut body to one of said structural numbers, a through hole in said nut body having a first hole portion with one diameter and a second hole portion with another diameter greater than said one diameter, said nut body having a transition section between said first and second hole portions, said transition section having a first tapered part, a split-nut means disposed in said second hole portion, said split-nut means being split into at least two split-nut sections, said split-nut means having a longitudinal end having a second tapered part, biasing means in said nut body biasing said split-nut means toward said first tapered part such that said first and second tapered parts are biasingly engaged, said bolt element having external fastening means, said split-nut means having internal fastening means, said bolt element being axially insertable into said split-nut means such that said external fastening means engage said internal fastening means to temporarily separate said split-nut sections against the bias of said biasing means as said first tapered part engages said second tapered part, said bolt element being precluded from being withdrawn axially from said split-nut means by the mating of said external and internal fastening means.

2. A self-locking nut mechanism according to claim 1, wherein said split-nut means comprises two split-nut sections which are mateable along a diametrical plane so that when said two split-nut sections are mated into engaging contact along said diametrical plane, a generally cylindrical passage is formed in said split-nut means, said internal fastening means being disposed on said cylindrical passage.

3. A self-locking nut mechanism according to claim 1, wherein said split-nut means comprises an internal passage on which said internal fastening means is formed, said split-nut means further comprising two split-nut sections having a mating position and a spaced position, said biasing means biasing said two split-nut sections into said mating position before said bolt element is inserted into said internal passage, said two split-nut sections being moved away from one another from said mating position to said spaced position when said bolt element is inserted into said internal passage.

4. A self-locking nut mechanism according to claim 3, wherein the mean internal diameter of said fastening means on said internal passage of said split-nut means when in said mating position is less than the mean diameter of the external fastening means on said bolt element.

5. A self-locking nut mechanism according to claim 1, wherein said longitudinal end of said split-nut means having said second tapered part is designated a first longitudinal end, said split-nut means having a second longitudinal end engaged by said biasing means, said bolt element being axially and non-rotatably movable in said split-nut means in one axial direction from said one longitudinal end toward said second longitudinal end as said split-nut sections move radially apart, said split-nut means preventing said bolt element from being axially and non-rotatably movable in an opposite axial direction.

6. A self-locking nut mechanism according to claim 5, wherein the position of split-nut sections when said bolt element is being axially and non-rotatably moved in said one axial direction is designated a first operable position, said internal and external fastening means being non-fastenably engaged with one another when said split-nut sections are in said first operable position to thereby permit said bolt element to be axially and non-rotatably moved in said one axial direction, said split-nut sections having a second operable position in which said internal and external fastening means are fastenably engaged to prevent said bolt from being axially and non-rotatably moved in an opposite axial direction.

7. A self-locking nut mechanism according to claim 6, wherein said internal and external fastening means comprise helical threads which are operably mated and engaged when said split-nut sections are in said second operable position, said helical threads being non-operably engaged when said split-nut sections are in said first operable position.

8. A self-locking nut mechanism according to claim 1, wherein said biasing means comprises a spring having two longitudinal ends, said biasing means further comprising a securing means disposed within said larger diameter portion of said cylinder portion, one of said longitudinal ends of said spring bearing against said securing means, the other longitudinal end of said spring means bearing against said split-nut means.

9. A self-locking nut mechanism according to claim 8, wherein said securing means comprises a washer element mounted on said nut body.

10. In a structure for a building comprising a plurality of wood log elements arranged in superimposed array one on top of the other and having two end log elements, a bolt element extending within a through opening in each of said log elements and extending between said two end log elements, said bolt element having one end and an opposite end, a bolt head on said one end engaging one of said end log elements, and a self-locking nut mechanism disposed on said opposite end of said bolt element and engaging the other of said log elements, said self-locking nut mechanism including a nut body having a cylinder portion and a flange portion, means on said flange portion for fastening said nut body to said other log element, a through hole in said nut body having a first hole portion with one diameter and a second hole portion with another diameter greater that said one diameter, said nut body having a transition section between said first and second hole portions, said transition section having a first tapered part, a split-nut means disposed in said second hole portion, said split-nut means being split into at least two split-nut sections, said split-nut means having a longitudinal end having a second tapered part, biasing means in said nut body biasing said split-nut means toward said first tapered part such that said first and second tapered parts are biasingly engaged, said bolt element having external fastening means, said split-nut means having internal fastening means, said bolt element being axially insertable into said split-nut means such that said external fastening means engages said internal fastening means to temporarily separate said split-nut sections against the bias of said biasing means as said first tapered part engages said second tapered part, said bolt element being precluded from being withdrawn axially from said split-nut means by the mating of said external and internal fastening means.

11. In a structure according to claim 10 further comprising bolt head means on said one end of said bolt element, and securing means fastening said bolt head means to said one log element.

12. In a structure according to claim 10 further comprising securing means securing said flange portion to said other log element.

* * * * *